United States Patent [19]
Huber

[11] Patent Number: 5,076,412
[45] Date of Patent: Dec. 31, 1991

[54] CASTER ROLLER UNIT

[75] Inventor: Thomas Huber, Iffeldorf, Fed. Rep. of Germany

[73] Assignee: Bavaria Cargo Technologie GmbH, Fed. Rep. of Germany

[21] Appl. No.: 607,335

[22] Filed: Oct. 31, 1990

[30] Foreign Application Priority Data

Dec. 28, 1989 [DE] Fed. Rep. of Germany ....... 3943185

[51] Int. Cl.[5] .............................................. B65G 13/00
[52] U.S. Cl. ................................. 193/35 MD; 193/37
[58] Field of Search .......................... 198/782, 787; 193/35 MP, 37; 244/137.1

[56] References Cited

U.S. PATENT DOCUMENTS

| | | | |
|---|---|---|---|
| 1,322,808 | 11/1919 | Mikaelson | 193/35 MD |
| 3,343,204 | 9/1967 | Ford | 193/37 |
| 3,435,938 | 4/1969 | Warren et al. | 193/37 |
| 3,530,967 | 9/1970 | Huber et al. | 193/37 |
| 3,747,736 | 7/1973 | Kornylak | 198/787 X |
| 3,871,501 | 3/1975 | Kornylak | 193/37 X |
| 4,125,183 | 11/1978 | Lang | 193/37 |
| 4,541,768 | 9/1985 | Walker et al. | 193/35 MD X |
| 4,553,795 | 11/1985 | Takagi | 193/35 MD X |
| 4,589,542 | 5/1986 | Steadman | 198/782 |
| 4,778,041 | 10/1988 | Blaurock | 193/35 MD |
| 4,949,837 | 8/1990 | Huber | 244/137.1 X |

FOREIGN PATENT DOCUMENTS

| | | |
|---|---|---|
| 329816 | 8/1989 | European Pat. Off. . |
| 3722399 | 1/1989 | Fed. Rep. of Germany ........ 193/37 |
| 2605369 | 4/1988 | France . |
| 211992 | 4/1967 | Sweden .......................... 193/35 MD |
| 357524 | 11/1961 | Switzerland . |

Primary Examiner—D. Glenn Dayoan
Attorney, Agent, or Firm—Sughrue, Mion, Zinn Macpeak & Seas

[57] ABSTRACT

A caster roller unit for a freight conveyor track includes first and second support rollers to support the freight articles from below. The rollers are mounted on a roller carrier rotatably independently of each other about horizontally extending, mutually aligned axes. The roller carrier is supported on a stationary housing base member by a ball bearing assembly rotatably about a vertical axis which is eccentric with respect to the axis of the rollers. The roller carrier, for each of the support rollers, has an upwardly open bearing shell member in the form of a cylinder portion accommodating a plurality of bearing needles on which the respective support roller is rotatably disposed and the longitudinal axes of which are oriented parallel to the horizontally extending axis of rotation of the respective support roller. A housing cover member fixedly connected to the roller carrier embraces the support rollers from above to retain the support rollers and the bearing needles in the bearing shell member, with the support rollers projecting upwardly beyond the upper outward surface of the housing cover member.

9 Claims, 2 Drawing Sheets

CASTER ROLLER UNIT

BACKGROUND OF THE INVENTION

The movement and handling of freight, for example in the form of containers, often involves the use of a conveyor track on which the freight article is movably supported. The conveyor track may include caster roller units each comprising at least one support roller which is mounted on a roller carrier rotatably about its axis of symmetry. The roller carrier is mounted on a base rotatably about an axis which is arranged eccentrically and perpendicularly with respect to the axis of rotation of the support roller.

Caster roller units of that kind, as can be found for example in U.S. Pat. specification No. 3,435,938, are used whenever an article is to be moved over a normally horizontal floor surface on which it is supported, and in that situation is to be provided with a 'weak' guiding action in its respective direction of movement. In that connection the term 'weak' guiding action means that the article to be moved is subjected to a stronger guiding action than is the case for example when it rests on ball-type support array, but on the other hand the guiding action is not so rigid that the direction of movement of the article cannot be altered at any time. When such an alteration in the direction of movement has occurred, then the same 'weak' guiding action is to take effect in the new direction of movement, as in the preceding direction of movement.

Such a caster roller unit generally comprises two support rollers which are mounted on a roller carrier in juxtaposed relationship in such a way that their axes of symmetry about which they are rotatable independently of each other are in alignment with each other. The unit may be mounted either on a surface over which the article to be moved is actually moved, as in the case of a conveyor track as mentioned above, but equally it may be mounted on the actual article to be moved. The first-mentioned configuration is used in a particularly important situation of use, namely in relation to freight loading equipment for aircraft, in which freight containers must each be turned through 90° in the region of a load compartment door, during loading and unloading operations.

If, in such a loading operation, a container runs with its flat underside on a caster roller unit, then, if the axes of rotation of its two directly juxtaposed support rollers are not oriented normal to the direction of movement of the container, the caster roller unit will rotate about its vertical axis until the above-described orientation is reached. When that happens, the two support rollers rotate in opposite directions of rotation and roll against the bottom of the container which is disposed thereon, whereby a very small amount of friction is produced. After the unit has been turned into the correct orientation, the two support rollers rotate in the same direction, in the direction of movement of the container, and afford same a 'weak' guiding action in that direction of movement as they support the container with a linear contact. It will be appreciated that guiding action is not so rigid that the direction of movement of the container could not be altered. If that happens, the caster roller unit rotates about its vertical axis until the axes of rotation of the support rollers are again normal to the new direction of movement of the container.

In the caster roller unit which can be found in U.S. Pat. specification No. 3,435,938, in order to achieve the above-described functions, the roller carrier which is approximately in the form of a downwardly tapering right circular truncated cone is fixed to a base member by means of a vertically arranged bolt which extends along the axis of symmetry of the truncated cone, and a nut which is screwed on to said bolt, in such a way that the roller carrier is rotatable about the fixing bolt, with an annular ball bearing assembly serving as a support means in relation to the base member. Laterally of the fixing bolt the roller carrier has two openings in which the two carrier wheels or rollers are respectively arranged rotatably about a horizontal axis in such a way that their peripheral surfaces project beyond the upward surface of the roller carrier in order to support the article to be moved. In that arrangement the two support rollers are mounted by means of a single shaft which extends through the assembly and which is arranged eccentrically with respect to the vertical bolt and which is fixedly mounted on the roller carrier and on which each of the two support rollers is freely rotatably mounted by means of ball bearing assemblies.

The disadvantages of that known caster roller unit are that it involves a high level of production expenditure and is of comparatively great weight. In particular the roller carrier is of such a complicated form that the production thereof requires a multiplicity of machining steps involving boring, turning and milling operations. In addition assembly of the individual components is not an entirely simple procedure as screwing operations have to be carried out and it is only after the support rollers have been fitted into the openings in the roller carrier that the mounting shaft for the support rollers can be passed through the mounting bores thereof in the roller carrier, and through the support rollers, and secured to the roller carrier.

SUMMARY OF THE INVENTION

An object of the present invention is to provide a caster roller unit which is of a simple design configuration while being reliable in operation.

Another object of the present invention is to provide a caster roller unit which is constructed from components which are simple to produce or are commercially available in a finished condition, and which can be easily assembled and installed at the point of use.

Still another object of the invention is a caster roller unit which is low in weight to make it suitable for use in an aircraft freight context.

In accordance with the principles and teachings of this invention the foregoing and other objects are attained by a caster roller unit of the configuration defined in accordance with the present invention.

The construction according to the invention enables a central component of the caster roller unit, namely the roller carrier, to be produced in the form of a simple deep-drawn member. The or each support roller is then mounted in the deep-drawn member by the respectively associated bearing shell member being filled with bearing needles disposed in juxtaposed relationship, the support roller being positioned on the bearing needles and retained thereon by the roller holder which is pushed thereover from above and which is fixedly connected to the roller carrier. As the roller holder only serves to prevent the support roller and the bearing needles from falling out of the bearing shell member, it can be in the form of a simple injection-molded plastic member. The roller carrier is supported on the base member in the usual way by means of a ball bearing assembly. That therefore provides a caster roller unit which includes commercially available components, namely bearing needles, bearing balls and the support roller, and other parts which are simple to produce, namely the roller carrier and the roller holder, so it can be produced and assembled in an extremely simple fashion.

The parts of the caster roller unit according to the invention can be low in weight, so that it is well suited to use in freight loading units for aircraft.

In order to provide that the support roller which is supported on the bearing needles can rotate about the axis of symmetry thereof with a particularly low level of friction, a preferred feature provides that arranged at the side of the roller carrier which is in opposite relationship to the support roller is a rotational shell carrier which includes a part-cylindrical rotational shell which extends around the bearing shell member and the radius of the cylindrical configuration of which is such that a part-cylindrical annular space is formed between the inside of the rotational shell carrier and the outside of the bearing shell member, the internal width of the part-cylindrical annular space being somewhat greater than the outside diameter of the bearing needles and also being filled with bearing needles and communicating with the interior of the bearing shell member by way of openings which are provided in the two edge regions of the part-cylindrical wall of the bearing shell member and parallel to the longitudinal axis thereof and are of such a dimension that, upon a rotary movement of the associated support roller, the bearing needles can transfer through one of the two openings from the interior of the bearing shell member into the part-cylindrical annular space and through the other of the two openings from the part-cylindrical annular space into the interior of the bearing shell member.

In a caster roller unit which includes two support rollers, the roller carrier is of a particularly simple configuration by virtue of the features that the two support rollers are arranged in a common bearing shell member in such a way that between the oppositely disposed ends thereof there is a spacing which ensures that they can rotate independently.

A particularly good supporting action for the support rollers in the respective bearing shell member is afforded by the bearing needles being of the same axial length as the respectively associated support roller.

So that the roller holder can be connected to the roller carrier in as simple a fashion as possible and in a releasable manner, there are preferably provided first locking elements, by means of which the roller holder is adapted to be secured to the roller carrier by a simple retaining engagement or detent action. Preferably the rotational shell carrier may also be fixedly connected to the roller carrier by a simple retaining engagement or detent action, by means of said first locking elements.

A particularly preferred embodiment is characterised in that there is provided a housing base member which is open in a cup-like configuration and which is of substantially circular-cylindrical cross-section and which is stationary in operation of the caster roller unit and which, in the end region of the wall of its cylindrical configuration, has a mounting shoulder which extends substantially perpendicularly to the wall of the cylindrical configuration and which extends over the entire periphery thereof and on which the roller carrier is supported by way of bearing balls for rotational movement about the axis of the caster roller unit, and that a housing cover member substantially in the form of a circular ring is secured to the housing base member in such a way that it engages over the mounting shoulder from the outside and in so doing rotatably fixes the roller carrier to the housing base member.

By virtue of those features, in a development of the invention, the base member can also be produced in the form of a simple deep-drawn member of metal while the housing cover member can again be made from plastic material as it only serves to prevent the roller carrier and the bearing balls from falling out of the housing base member.

Preferably the roller carrier is supported on the bearing balls by way of the rotational shell carrier which is then also in the form of a deep-drawn metal member as it transmits the load forces acting by way of the rollers and the bearing needles on the roller carrier, to the housing base member.

In order to make the fixing of the housing cover member to the housing base member as simple as possible, the unit preferably has second locking elements, by means of which the housing cover member, in the form of a circular ring, is adapted to be secured to the housing base member by a simple retaining engagement or detent action. In accordance with a particularly preferred embodiment the second locking elements may be used at the same time to secure the caster roller unit to a base structure, for example a conveyor track panel member, by a simple retaining engagement or detent action.

Further objects, features and advantages of the invention will become apparent hereinafter.

DESCRIPTION OF PREFERRED EMBODIMENTS

Figure 1:
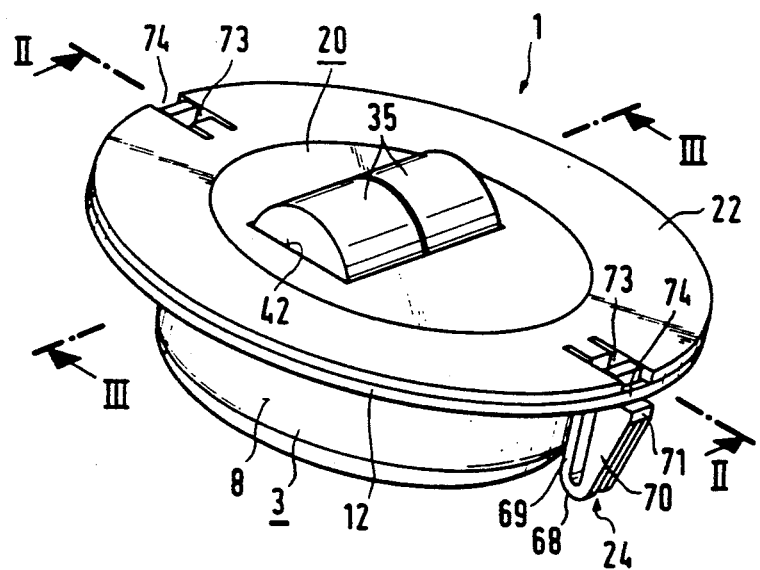
FIG. 1 is a perspective view of a caster roller unit according to the invention.
Figure 2:
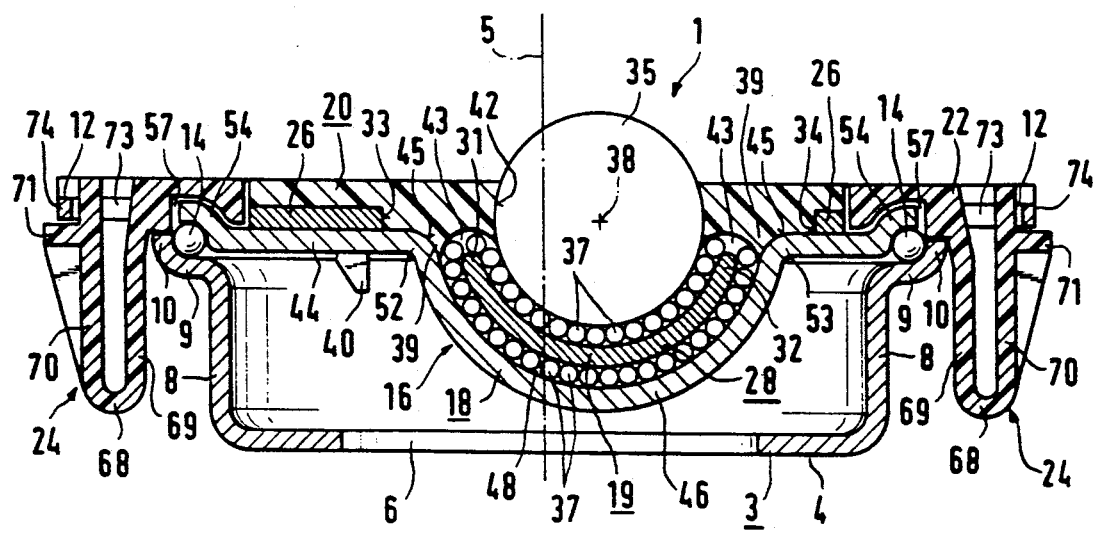
FIG. 2 is a view of the caster roller unit of FIG. 1 in vertical section taken along line II—II in FIG. 1.
Figure 3:
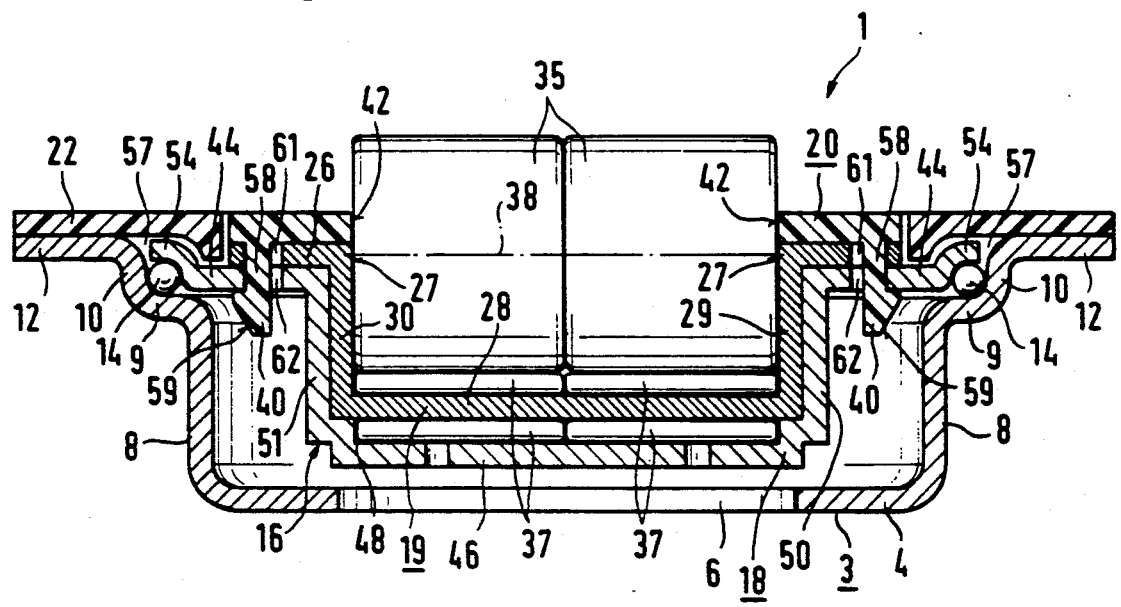
FIG. 3 is a view of the caster roller unit in vertical section taken along line III—III in FIG. 1.

As can be seen from FIGS. 1 through 3, a caster roller unit 1 according to the invention includes a housing base member 3 which is substantially of a circular-cylindrical configuration and which is open upwardly in a cup-like form; the bottom wall 4 of the housing base member 3, which extends horizontally in the usual position of operation has a circular opening 6 which is arranged concentrically with respect to the vertical axis of symmetry 5 of the housing base member 3. The vertically upwardly extending cylindrical wall 8 of the housing base member 3, in the upper region thereof, has a horizontal bearing shoulder 9 which extends over the entire periphery thereof and which is adjoined in an upward direction by a short, vertically extending cylindrical wall portion 10 which at its upper end goes into a horizontal support flange 12 of the housing base member 3, the support flange 12 being in the form of a circular ring and extending over the entire periphery of the housing base member 3.

Arranged on the top side of the bearing shoulder 9 are bearing balls 14 which are distributed over the entire periphery of the housing base member 3 and on which a rotary unit 16 is supported in such a way that it can rotate freely about the axis of symmetry 5 of the caster roller unit 1. The rotary unit 16 includes a rotational shell carrier, 18, a roller carrier 19 and a roller holder 20 which are described in greater detail hereinafter.

The rotary unit 16 is held in its position on the bearing balls 14 by a housing cover member 22 which is substantially in the form of a circular ring and which lies flat on the support flange 12 of the housing base member and is fixedly connected thereto by way of two locking elements 24 which are described in greater detail hereinafter. The housing cover member 22 is of approximately the same outside diameter as the horizontal support flange 12 of the housing base The roller carrier 19 which forms the central component of the rotary unit 16 comprises a circular disc 26 which in the assembled condition is arranged horizontally and which has a rectangular opening 27 extending therethrough, the opening 27 being so positioned that it is disposed symmetrically with respect to a diameter of the circular disc 26 but eccentrically with respect to the center point of the circular disc 26, which is formed by the point at which the axis of symmetry 5 passes therethrough. Beneath the opening 27 is a bearing shell member 28 which is in the form of an upwardly open segment of a circular cylinder, with its axis extending horizontally. The bearing shell member 28 is integrally connected by way of the end walls 29, 30 of the segment of the circular cylinder, to the circular disc 26 of the roller carrier 19, as can be seen in particular from FIG. 3. In comparison therewith the bearing shell member 28 which is of a part-circular cylindrical configuration is not connected to the circular disc 26, in the region of the edges 31 and 32 of the bearing shell member 28, which are parallel to the axis of the assembly. On the contrary provided in that region are two openings 33 and 34 which extend over the entire axial length of the bearing shell member 28 and the significance of which will be described in greater detail hereinafter.

Inserted into the mounting space formed by the bearing shell member 28 are two circular-cylindrical support rollers 35 which are supported on the bearing shell member 28 by way of bearing needles 37. The diameter of the support rollers 35 is of such a magnitude, in relation to the depth of the bearing shell member 28, that the peripheral surfaces of the support rollers 35 project beyond the upward flat surface of the housing cover member 22, to such an extent that articles which are supported thereon can move freely over that surface.

The axial length of the two support rollers 35 is approximately half the axial length of the bearing shell member 28 so that the support rollers 35 can rotate freely and independently of each other about their mutually aligned, horizontally extending axes of symmetry 38. Between the mutually directly oppositely disposed end faces of the support rollers 35 and between the outwardly disposed end faces thereof and the end walls 29, 30 of the bearing shell member 28 are respective intermediate spaces which are of sufficient size but which are not shown in the drawings.

The bearing needles 37 are of approximately the same axial length as the respectively associated support roller 35. Therefore, disposed in the bearing shell member are two groups of bearing needles 37, which groups are arranged one behind the other in the axial direction and each of which extends in a part-circular configuration around the associated support roller 35.

From above, the bearing shell member is closed by a roller holder 20 which is fixedly connected thereto by way of locking elements 40. As can be seen in particular from FIG. 1, the roller holder 20 is also in the form of a circular disc in which there is provided a rectangular opening 42 corresponding to the rectangular opening 27 in the circular disc 26. The support rollers 35 can project upwardly through the rectangular opening 42. The upward surface of the roller holder 20 is coplanar with the upper surface of the housing cover member 22. It is above the axes of symmetry 38 of the two support rollers 35 and the rectangular opening 42 disposed therein is of such a dimension that, with its edges which are parallel to the axis, it extends immediately to the peripheral surfaces of the support rollers 35. The side walls of the rectangular opening 42, which extend downwardly from said edges which are parallel to the axis, are of a part-circular cylindrical form so that they also are disposed in opposite relationship to and at a small spacing from the outward peripheral surfaces of the support rollers 35. Since, as already mentioned, the axes of symmetry 38 of the support rollers 35 are lower than the upward surface of the roller holder 20, the support rollers 35 are held in the bearing shell member 28 by the roller holder 20 in that way.

In the region of the openings 33, 34 of the roller carrier 19, which are parallel to the axis of the assembly, the roller holder 20 is provided at its underside with two projections 39 which extend over the entire length of the openings 33, 34 and which project downwardly into those openings and the lower surfaces of which are of such a configuration that, with the edges 31, 32 of the bearing shell member 28, which are disposed in opposite relationship to said surfaces of the projections 39, the projections 39 form passage portions 43 which lead out of the interior of the bearing shell member 28 and which open downwardly and through which the bearing needles 37 can issue from the space inside the bearing shell member 28 and can pass into said space.

The third component of the rotary unit 16 is formed by the rotational shell carrier 18 which essentially also comprises a circular disc 44 with an eccentrically disposed, rectangular opening 45 and a rotational shell portion 46 which extends under the opening 45. The rectangular opening 45 and the shell portion 46 are so arranged that, in the assembled condition, they are disposed beneath and aligned with the rectangular opening 27 and the bearing shell member 28 respectively. The dimensions of the shell portion 46 are so selected that enclosed between the inside part-cylindrical surface thereof and the part-cylindrical outside surface of the bearing shell member 28 is a part-cylindrical annular space 48 into which the passage portions 43 open and the internal width of which is somewhat greater than the outside diameter of the bearing needles 37. The part-cylindrical annular space 48 which is arranged concentrically with respect to the part-cylindrical configuration enclosed by the bearing shell member 28, and thus also concentrically with respect to the axes of symmetry or rotation 38 of the support rollers 35, makes it possible for bearing needles 37 which for example in the case of a rotary movement of the support rollers 35 about their axes of symmetry 38 in the clockwise direction in FIG. 2, issue from the interior of the bearing shell member 28 through the passage portion 43 which is on the left-hand side in FIG. 2, to be passed around the outside of the bearing shell member 28 and go back into the interior of the bearing shell member 28 again through the passage portion 43 which is on the right-hand side in FIG. 2.

The groups of bearing needles associated with each support roller 35 are therefore arranged in a circulatory or rotational system in such a way that, upon a rotary movement of the associated support roller 35, they do not have to rotate on the spot, at the location where they are disposed, but can roll against and move along the bearing shell member 28. That results in a considerable reduction in the level of bearing friction which must be overcome upon a rotary movement of the support rollers 35.

The axial length of the shell portion 46 is so selected that the end walls 50 and 51 thereof bear with their inside surfaces directly against the outside surfaces of the end walls 29 and 30 of the bearing shell member 28 (see FIG. 3). Unlike the bearing shell member 28, the shell portion 46, in the region of its edges 52 and 53 which are parallel to the axis of the assembly, merges into the circular disc portion 44, without any interruption therebetween. At the shoulders which are formed at those locations, the roller holder 20 bears against the shoulders from above with its downwardly projecting projections 39 in such a way that the passage portions 43 are open only towards the interior of the bearing shell member 28 and the part-cylindrical annular space 48, but are otherwise closed.

The circular disc 44 of the shell carrier 18 is of a diameter which is larger than the diameter of the circular disc 26 and the roller holder 20 and approximately corresponds to the diameter of the housing base portion 3 between its cylindrical wall portions 10. At its outer edge the circular disc 44 has an upwardly and outwardly bulging edge bead portion 54 which at its underside provides a channel or groove which is of part-circular cross-section and which extends over the entire periphery of the circular disc and which lies on the bearing balls 14 and embraces same in a cage-like configuration, in combination with the bearing shoulder 9 of the housing base member 3.

At its underside the housing cover member 22 has an annular groove 57 which is adapted in regard to its shape to the edge bead portion 54 and which engages over same in the assembled condition, whereby, in the assembled condition, in which, as mentioned above, the housing cover member 22 is fixedly connected to the housing base member 3, the shell carrier 18 is secured to the housing base member 3 in such a way that it can rotate only about the vertical axis of symmetry 5, but otherwise cannot move with respect to the housing base member 3. As the locking elements 40, by means of which the roller holder 20 is fixedly connected to the roller carrier 19, serve at the same time also for securing those two components as just mentioned above to the shell carrier 18, the entire rotary unit 16 and therewith the support rollers 35 held by the roller holder 20 is rotatably secured to the housing base member 3.

As can be seen in particular from FIG. 3, the retaining connecting elements 40 comprise projections or lugs 58 which project downwardly from the underside of the roller holder 20 and which are each provided at their lower end with an enlarged head having an inclined surface 59 which extends inclinedly outwardly in an upward direction, and a retaining shoulder which adjoins the surface 59 in an upward direction. In the assembled condition the lugs 58 extend through mutually aligned openings 61 and 62 in the circular discs 26 and 44 respectively of the roller carrier 19 and the shell carrier 18 respectively, the internal width thereof being such that the enlarged head of each lug 58 can be pushed therethrough. In that assembly operation, each of the lugs 58 is bent somewhat laterally by virtue of the inclined surface 59 sliding against the upper edge of the opening 61. From that laterally bent position, the lugs 58 spring back into their precisely vertically downwardly directed position shown in FIG. 3, as soon as the enlarged head has passed entirely through the associated lower opening 62. In that situation the retaining shoulder engages behind the lower edge of the associated opening 62, whereby the roller holder 20 is fixedly locked in position.

Therefore the assembly of a caster roller unit according to the invention is effected in such a way that two groups of bearing needles 37 are firstly fitted into the shell portion 46 of the shell carrier 18 in the manner shown in FIG. 3. Thereupon, a roller carrier 19 is fitted on to the shell carrier 18 and the interior of the bearing shell member 28 is also filled with two groups of bearing needles 37 on to which the support rollers 35 are then placed. The roller carrier 20 is then pushed from above over the support rollers 35 and secured to the shell carrier 18 by means of the locking elements 40, whereby at the same time a firm connection between those two elements and the roller carrier 19 is also made. The rotary unit 16 which is formed in that way can then be fitted downwardly into the housing base member, after bearing balls 14 have previously been arranged on the bearing shoulder 9 thereof, with the bearing balls lying closely against each other over the entire periphery of the bearing shoulder. The housing cover member 22 is then fitted into position from above and secured to the housing base member 3 by means of the locking elements 24.

Figure 4:
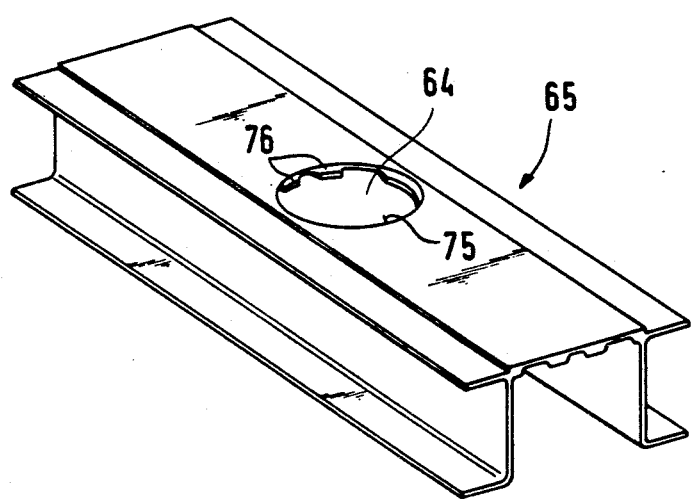
FIG. 4 is a perspective view of a portion of a conveyor track panel member with an opening into which a caster roller unit according to the invention can be inserted.

As is described in greater detail hereinafter with reference to FIG. 4, a caster roller unit 1 which is formed in that way can then be fitted for example into an opening 64 in a conveyor track panel member 65, with the locking elements 24 performing a dual function insofar as, after that insertion operation, they connect not only the housing cover member 22 and the housing base member 3 but also the entire unit 1 to the conveyor track panel member 65. As can be seen from FIGS. 1 and 2, each of the locking elements 24 includes an upwardly open U-shaped spring portion 68, the inner vertical leg 69 of which is integrally connected to the housing cover member 22. The outer vertical leg 70 which extends upwardly at a small spacing from the inner leg 69, in the vicinity of its upper free end, carries a radially outwardly projecting locking shoulder 71. The spacing of the outer leg 70 from the inner leg 69 is so selected that, when a pressure is applied to the free end of the resiliently deflectable outer leg 70, the outer leg 70 can move towards the center of the housing cover member 22 to such an extent that the locking shoulder 71 can above inwardly towards the middle of the housing cover member 22 which is in the form of a circular ring, at least by a distance corresponding to the radial width of the locking shoulder 71.

In the assembled condition of the caster roller unit 1, the U-shaped spring portions 68 of the locking elements 24 engage downwardly through rectangular apertures 73 in the support flange 12 of the housing base member 3, and in particular the locking shoulder 71 engages under a limb portion 74 of the respective aperture 73 whereby, as already mentioned above, the caster roller unit 1 consisting of the rotary unit 16, the housing base member 3 and the housing cover member 22 is held together.

However the locking shoulders 71 are of such a radial width that they project outwardly beneath the respective limb portion 74 and can engage under the peripheral edge 75 of the associated opening 64 in the conveyor track panel member 65. In that condition the caster roller unit 1 is held in a downward direction by base segments 76 (see FIG. 4) which project into the opening 64 while it is supported against the underside of the peripheral edge 75 of the opening 64 in the conveyor track panel member 65, and as a result cannot move out upwardly, by the outer ends of the locking shoulders 71.

To remove the caster roller unit 1 from the conveyor track panel member 65, a force which is directed towards the center of the caster roller unit 1 is applied to the free ends of the locking elements 24 by means of a suitable tool until the outer vertical legs 70 are sprung inwardly towards that center to such an extent that the respective locking shoulder 71 comes out from under the peripheral edge 75 of the conveyor track panel member 65. In that condition the caster roller unit 1 can then be removed from the opening 64 in an upward direction without the way in which the caster roller unit 1 is securely held together being adversely affected as a result, since the locking shoulders 71 still engage under the limb portions 74 of the housing base member 3.

If the caster roller unit is to be taken apart, the free ends of the outer vertical legs 70 are bent still further resiliently towards the center of the caster roller unit 1 until the outer ends of the locking shoulders 71 come out from under the limb portions 74 so that the housing cover member 22 can be removed from the housing base member 3 in an upward direction. In a corresponding manner, the downwardly projecting lugs 58 of the locking elements 40 can then also be bent inwardly in order to permit the rotary unit 16 to be dismantled.

The load carried by the support rollers 35 is transmitted from same by way of the bearing needles 37 to the bearing shell member 28 of the roller carrier 19 and from same to the circular disc 44 of the shell carrier 18 which in turn is supported by way of the bearing balls 14 on the bearing shoulder 9 of the housing base member 3. From the bearing shoulders 9, the load to be carried is transferred over a very short distance by way of the support flange 12 which in the assembled condition lies on the base segments 76 of the opening 64. The bearing needles 37 in the part-cylindrical annular space 48 do not have any load to carry and can therefore above with minimum friction from one passage portion 43 to the other.

The load-bearing members, that is to say the housing base member 3, the shell carrier 18 and the roller carrier 19, are preferably made from metal in the form of deep-drawn components. In contrast the roller holder 20 and the housing cover member 22 can be made from resilient plastic material. The opening 6 in the bottom wall 4 of the housing base member 3 contributes to reducing the weight of the unit. That therefore provides a caster roller unit which is of very low weight, which is made from a small number of components which are simple and inexpensive to be produced, and which can be very easily assembled.

It will be appreciated that the foregoing description of preferred embodiments has been set forth only by way of example and illustration of the principles of the invention and various other modifications and alterations may be made therein without thereby departing from the spirit and scope thereof.

What is claimed is:

1. A caster roller unit comprising:
   at least a first support roller having a cylindrical outer surface and an axis of symmetry and being adapted to support an article to be moved,
   a roller carrier in which the support roller is mounted rotatably about said axis of symmetry, the roller carrier including a bearing shell member substantially in the form of a hollow part-cylinder,
   a plurality of bearing needles each having a longitudinal axis and being accommodated in the bearing shell member, the cylindrical outer surface of said support roller being rotatably supported on said bearing needles in such a way that the longitudinal axes of the bearing needles are oriented parallel to said axis of symmetry of the support roller,
   a roller holder adapted to be fixedly connected to the roller carrier and embracing the support roller from the outside thereof, with the support roller projecting above the roller holder, thereby to retain the support roller and the bearing needles in the bearing shell member, and
   a base means in which the roller carrier is mounted rotatably about an axis which is arranged eccentrically and perpendicularly with respect to said axis of symmetry of the support roller,
   a rotational shell carrier at the side of the roller carrier which is opposite to the support roller, the shell carrier including a part-cylindrical rotational shell portion which embraces the bearing shell member, the radius of said part-cylindrical rotational shell portion being such that formed between its inside surface and the outside surface of the bearing shell member is a part-cylindrical annular space, the internal width of which is somewhat larger than the outside diameter of said bearing needles, and
   a second plurality of bearing needles in said part-cylindrical space, said part-cylindrical space being communicated with the interior of the bearing shell member by way of openings provided in edge regions of the part-cylindrical wall of the bearing shell member and parallel to the longitudinal axis thereof and so dimensioned that upon a rotary movement of the support roller bearing needles are capable of transfer through one of the openings out of the interior of the bearing shell member into the part-cylindrical annular space and through the outer of the two openings out of the part-cylindrical annual space into the interior of the bearing shell member.

2. A caster roller unit as set forth in claim 1 further comprising a second support roller also having a cylindrical outer surface and an axis of symmetry, the cylindrical outer surface of said second support roller being rotatably supported in juxtaposed relationship to said first support roller on said bearing needles in such a way the axes of symmetry about which said two support rollers are rotatable independently of each other are aligned with each other, wherein the support rollers are arranged in a common bearing shell member with a spacing between their mutually oppositely disposed ends to ensure that they are rotatable independently of each other.

3. A caster roller unit as set forth in claim 1 wherein the bearing needles are of substantially the same axial length as the associated support roller.

4. A caster roller unit as set forth in claim 1 including first locking elements adapted to retain the roller holder to the roller carrier by a simple retaining engagement action.

5. A caster roller unit as set forth in claim 4 wherein said first locking elements are also adapted to secure said shell carrier to the roller carrier.

6. A caster roller unit as set forth in claim 1 wherein said base means includes a housing base member of an open cup-like configuration and of a substantially circular cross-section, which is stationary in operation of the caster roller unit, the housing base member comprising a wall of cylindrical configuration, in the free end region of said wall a bearing shoulder which extends substantially perpendicularly to the wall and extends over the entire periphery thereof, bearing means supporting the roller carrier on said bearing shoulder for rotary movement of the roller carrier about the axis of the caster roller unit, further including a housing cover member which is substantially in the form of a circular ring and means for securing the housing cover member to the housing base member in such a way that the housing cover member is adapted to engage over the bearing shoulder from the outside thereby rotatably to retain the roller carrier to the housing base member.

7. A caster roller unit as set forth in claim 6 wherein the roller carrier is supported on the bearing means by way of said shell carrier.

8. A caster roller unit as set forth in claim 6 wherein said housing cover member is substantially in the form of a circular ring and said securing means comprises second locking elements operable to retain the housing cover member to the housing base member by a further simple retaining engagement action.

9. A caster roller unit as set forth in claim 8 wherein said second locking elements are also adapted to secure the caster roller unit to a base structure.

* * * * *